United States Patent [19]

Trice et al.

[11] 3,884,868

[45] May 20, 1975

[54] COATING COMPOSITIONS COMPRISING POLYIMIDES AND POLYSILOXANES

[75] Inventors: Robert T. Trice, Fort Wayne; Gordon D. McLeod; Amos R. Anderson, both of Adrian; Dennis C. Wilson, Fort Wayne, all of Ind.

[73] Assignee: Phelps Dodge Industries, Inc., New York, N.Y.

[22] Filed: May 17, 1973

[21] Appl. No.: 361,133

[52] U.S. Cl............ 260/37 N; 117/132 B; 260/30.2; 260/37 SB; 260/824 R
[51] Int. Cl............................................. C08g 47/04
[58] Field of Search ...... 260/37 N, 32.6 NT, 824 R, 260/78 TF

[56] References Cited
UNITED STATES PATENTS

| 3,287,311 | 11/1966 | Edwards | 260/37 |
|---|---|---|---|
| 3,295,940 | 1/1967 | Gerow | 260/37 N X |
| 3,440,203 | 4/1969 | Boldebuck | 260/33.4 |
| 3,505,295 | 4/1970 | Grunsteidl | 260/77.5 |
| 3,632,440 | 1/1972 | Preston | 260/824 X |

OTHER PUBLICATIONS

Handbook of Reinforced Plastics, Oleesky, 1965, P. 180–183, USPO Grp. 140.

*Primary Examiner*—Joseph L. Schofer
*Assistant Examiner*—Paul R. Michl

[57] ABSTRACT

A coating composition which when applied to a substrate and baked forms a non-porous, tough and durable coating exhibiting good release properties comparable to polytetrafluoroethylene TEFLON II coatings, good abrasion, cut and scratch resistance, and good resistance to thermal degradation. The coating composition comprises an essentially linear, high molecular weight polyaromatic polycarboxylic aromatic polyimide and may include certain polyfunctional organic substituted polysiloxanes and/or powdered fillers and pigments.

12 Claims, No Drawings

COATING COMPOSITIONS COMPRISING POLYIMIDES AND POLYSILOXANES

BACKGROUND OF THE INVENTION

1. Field of the Invention

This invention relates to coating compositions, and more particularly, to coating compositions which can be applied to substrates as a non-porous, tough, durable, and relatively permanent coating exhibiting good cut, scratch, and abrasion resistance, and good release properties that can continuously withstand temperatures up to about 320°C and for short times up to about 430°C.

2. Description of the Prior Art

Coating compositions capable of being applied to substrates which exhibit good release properties, or good resistance to thermal degradation, or good abrasion resistance have been proposed heretofore. Cookware having Teflon II polytetrafluoroethylene coatings thereon have been available for some time through retail outlets. However, the disadvantages of such coatings are also widely known; they being porous so as to retain cooking oils therein; they having poor resistance to abrasion, poor scratch and cut resistance and poor adhesion to the substrates to which they are applied.

Other release coatings have been proposed; however, none of these release coatings are comparable to Teflon II polytetrafluoroethylene coatings. Both polyphenylene sulfide and polyimide coatings having a powdered polytetrafluoroethylene filler have been proposed by De Beers Laboratories, Inc. of Broadview, Illinois as a release coating. Also, release coatings for use on cookware and bakeware and the like have been sold through retail outlets in spray cans under the names "PANGLAZE" and "PAN SHIELD," the latter being a product of the Dow Corning Company. A similar pure silicone coating has been sold by Ekco Products, Inc. All of these coatings are less permanent than Teflon II polytetrafluoroethylene coatings, the last mentioned three coatings which are not sold as permanent coatings, last only from about five to about ten cooking cycles before re-application is required.

Additionally, numerous other coatings are available, some of which have good resistance to thermal degradation, for example, high temperature paints and varnishes; however, these coatings do not possess good release properties and may not possess the requisite thermal life required for use on cookware, bakeware, appliances, barbecue grills and the like.

It is therefore highly desirable to provide an improved relatively permanent coating composition which can be applied to substrates as a non-porous, tough, durable, and relatively permanent coating exhibiting good cut, scratch, and abrasion resistance, and release properties comparable to TEFLON II polytetrafluoroethylene coatings that can continuously withstand temperatures up to about 320°C and for short times up to about 430°C.

SUMMARY OF THE INVENTION

It is therefore the primary object of this invention to provide an improved release coating composition.

Another object of this invention is to provide an improved coating composition which can be applied on a substrate as a non-porous, tough, durable, and relatively permanent coating thereon exhibiting good cut, scratch and abrasion resistance, and adhesion to the substrate, which can be used at temperatures of about 320°C.

Another object of this invention is to provide such a coating which exhibits release properties comparable to Teflon II polytetrafluoroethylene coating compositions.

Another object of this invention is to provide an improved coating composition which can be used on cookware, bakeware, appliances, barbecue grills, and in similar applications.

In the broader aspects of this invention, there is provided a coating composition comprising an essentially linear, high molecular weight aromatic polyimide, and in specific embodiments, certain organic substituted polyfunctional polysiloxanes in an amount which may be as much as about 100 percent weight of said imide, and/or powdered fillers and pigments in an amount which may be as much as 1200% weight of said imide.

DESCRIPTION OF THE PREFERRED EMBODIMENT

The improved coating compositions of the invention comprise an essentially linear high molecular weight polyaromatic, polycarboxylic aromatic polyimide resin, certain organic substituted polyfunctional polysiloxanes in an amount up to about 100 percent weight of the polyimide, and a solvent of the polyimide in an amount of at least 300 percent of said polyimide. The coating compositions also may include certain powdered fillers and pigments up to about 800 percent weight of said imide. Fillers and pigments up to about 1200 percent weight of said imide can be present in the coating compositions of the invention having the polysiloxanes present in amounts less than 80 percent weight of the imide.

The polyaromatic, polycarboxylic aromatic polyimides which are useful in the coating compositions of the invention are either the polyamide-imides of trimellitic anhydride, such as poly(methylene p,p'-dianiline) amide-(methylene p,p'-dianiline) imide of trimellitic anhydride, or the polyimides of tetracarboxylic acids or dianhydrides such as 3,4,4' benzophenone tetracarboxylic dianhydride, pyromellitic dianhydride or the corresponding tetracarboxylic acids. Such materials are commercially available in the form of:

Al type 10 resin, as sold by Amoco Chemicals Company,

Pyre ML resin, as sold by duPont de Nemours Company. The assignee of the present application also has disclosed a process for making the former resin in its application, U.S. Pat. application Ser. No. 195,502, filed Nov. 3, 1971.

The various fillers and pigments which can be used in the coating compositions of the invention are numerous. All are powdered and preferably have an average particle size less than 2.5 microns with 98 percent thereof passing a standard 325 mesh screen. The particular fillers and pigments that have utility in the coating compositions of the invention include, but are not limited to zirconium silicate, silicon dioxide, titanium dioxide, aluminum oxide, iron oxide, chromium oxide, nickel titanate and cobalt aluminate.

The solvents having utility in the coating compositions of the invention also are many. However, each solvent having utility consists of or comprises a major portion of one or more of the solvents of the group of N-methyl-2-pyrrolidone, N,N dimethyl formamide, N,N diethyl formamide, N,N diethyl acetamide or mixtures thereof. Solvents which can be used with these solvents in minor proportions include xylene, xylol, aromatic petroleum fractions such as NJ–100, and NJ–150, as sold by Hoosier Solvents and Chemicals Corporation, furfural, butyrolactone. Preferably, none of these solvents disclosed to be used in minor proportions should be used in excess of 20 percent weight of the total solvents in the coating composition.

It has been found that certain of the above-mentioned pigments and fillers can be added to the coating composition to color the coating composition differently than its normal color. This can usually be achieved by adding the filler or pigment having the desired color in an amount less than 20 percent weight of the imide; the remainder can be of a neutral color, for example, such as zirconium silicate, silicon dioxide, or the like.

The organic substituted polyfunctional polysiloxanes which are useful in the coating compositions of the invention are each hydroxy terminated methyl and phenyl substituted polysiloxanes, the substitution of which can be described as having a degree of substitution from about 1.0 to about 1.5. All of these materials have an appreciable amount of trifunctional material therein. The "functionality" of material is equal to the number of Si-O bonds on the silicone atom of the material described. The "degree of substitution" mentioned above is defined as the valence of the silicone atom, which is four minus the number of oxygen atoms bonded to the silicone. For example, quartz or glass having the formula $[SiO_4]_X$ where X equals an integer indicating the molecular weight, would have a degree of substitution of O, whereas, a resin having the formula $[SiRO_3]_Y$ where Y is an integer indicating the molecular weight and R is any single valent group which can form a bond with a silicone atoms, would have a degree of substitution of 1. The ratio of phenyl substitution to methyl substitution is also critical. It has been found that pure phenyl substituted materials can be used in the compositions of the invention but do not add to the release characteristics of the compositions and thus are not preferred. Totally methyl substituted materials are totally immiscible with the polyimides of the invention, and thus, are also not preferred. All methyl and phenyl substituted polysiloxanes which are miscible with the polyimides of the invention to an acceptable degree have been found to enhance the release characteristics of the compositions of the invention. The acceptable degree of miscibility can be determined by mixing the polyimide and the polysiloxane to be used for 15 minutes and then letting the mixture stand. If a lack of miscibility is not evident in 30 minutes the polysiloxane can be used as an ingredient of the sprayable compositions of the invention. The degree of miscibility of useful polysiloxanes will vary for other methods of application. The terms "organic substituted polyfunctional polysiloxane resins" and "polysiloxane" as used herein refer to these above-described materials, and not to other organic substituted polyfunctional polysiloxane resins or polysiloxanes, of which there are numerous varieties.

Similarly, beyond the ranges disclosed hereinabove, the other ingredients of the coating composition of the invention are not preferred. Less total solvent renders the coating composition difficult to apply or non-homogeneous. Major amounts of solvent not being of the group of major solvent components disclosed above cause the ingredients of the coating composition to separate thereby giving the coating composition short shelf life. Larger amounts of filler and pigment than 1,200 percent weight of the imide result in a brittle coat rather than a flexible coat which possesses less scratch resistance and is more easily abraded. More polysiloxane than about 100 percent weight of said imide results in a heterogeneous coating composition having poor film properties. Thus, it can be seen that the limitations disclosed above are definitive of the coating composition of the invention.

There is no intention to limit this application to the particular polysiloxanes, the particular polyimides, the particular solvents, or the particular fillers and pigments mentioned hereinabove. In contrast, the full and broadest interpretation of the "doctrine of equivalents" is relied upon.

The coating compositions of the invention can be applied to substrates by spraying and baked into a nonporous, tough, durable coating having good resistance to thermal degradation, good cut, scratch and abrasion resistance, good adherence to the substrate, and good release properties. Tests have been developed for the purpose of comparing various formulations of the coating composition of the invention.

The abrasion resistance of the coating compositions of the invention can be compared by applying the coating composition to a disc and subjecting the coating to the wear action of two abrasive wheels rotating about a horizontal axis and engaging the specimen on a turntable which is rotated about an axis displaced tangentially from the axis of the wheels. This results in a sliding action between the abrading wheels and the test specimen. The pressure between the abrading wheels and the specimen is measured in grams. The specific Taber abraser used to arrive at the test results used herein is a Model 503 Taber abraser as manufactured and sold by Taber Instrument Company, North Tonawanda, New York, equipped with a 1,000 gram load and a pair of Calibrase CS-10 abrading wheels. The tests reported in Table II were all conducted on samples having a coating of a thickness of greater than 1.5 mil in thickness and are reported in Table II in terms of milligrams loss per one thousand revolutions. This weight loss was determined by weighing the samples before and after 1,000 revolutions. (See ASTM Method D–1044-56, reapproved 1969).

The adherence of the coating composition of the invention to a substrate can be compared by applying the coating composition to a substrate. The coating is then scratched by making 11 parallel cuts, one-sixteenth inch (1.6 millimeters) apart using a cross-cut tester or a razor blade, and then making a similar set of cuts perpendicular to the first cuts. A piece of cellulose tape is applied over the cuts and pressed firmly in place with a hand roller or a rubber eraser. The cellulose tape is lifted at one end to a 45° angle and removed rapidly, maintaining the same angle. The number of one-sixteenth inch squares removed by the tape are counted and the percent remaining is calculated. The results of these tests on various coating compositions of the invention are also reported in Table II. (See ASTM Test D-3002-71).

The hardness of the coating composition of the invention is compared both at room temperature and at 400°F using the pencil hardness method in Table II. Today, pencils are available in about 17 different grades of hardness, ranging from the hardest, 9H, to the softest, 6B. The pencils were sharpened, the lead was "squared" against fine abrasive paper, and the coating was scratched with the pencils held at an angle of 45° with respect to the surface of the coating. The hardness was recorded of the pencil which just barely scratches the coating. (See "Paint Testing Manual," G. G. Sward, Editor, 13th Ed. ASTM 1972, pages 283–284).

The release properties of the coating composition of the invention are compared in two different ways. First, in Table II, the release properties of each of the coatings of the invention reported therein are reported on a scale ranging from "excellent" to "unsatisfactory" with intermediate release properties being termed "average" and "good." These test results are the result of a subjective opinion of a laboratory technician conducting the cooking cycle test next to be described. Secondly, the release properties of selected coating compositions of the invention are compared in Table III with comparable coatings of polytetrafluoroethylene TEFLON II. This comparison is also derived from the cooking test to be shortly described, but relate only to acceptable release properties with reference to cooking in conventional cookware having no release coating and having a coating of polytetrafluoroethylene TEFLON II. Results reported with reference to these two standards is deemed "cooking release" in Table III, in contrast to merely "release" in Table II. The "cooking release" reported in Table III is reported as "excellent" if comparable to the release of polytetrafluoroethylene TEFLON II coatings and unsatisfactory if comparable to the release experienced of a conventional frying pan having no release coating. Intermediate "cooking release" properties are termed "good" and "average."

As above mentioned briefly, the utility of the coating composition of the invention as a high temperature coating having good resistance to thermal degradation, having good cut, scratch, and abrasion resistance, having good adherence to a substrate, and having good "cooking release" properties was determined by applying the coating composition to frying pans and subjecting the pans to cooking cycles in which eggs, pancakes and hamburgers are fried therein, the pans are washed, scoured if necessary, and reused. This test was found to be much more relevant than isolated tests of abrasion resistance, scratch resistance, adhesion, and chemical resistance. The test is believed to give the coating composition tested very abusive environment which includes various ways such coatings may be rendered unsatisfacotry, including scratching, cutting, gouging, scuffing, abrading, tearing, pelling, staining, absorbing impurities, failing because of thermal degradation, and failing because of severe chemical attack. The data regarding polytetrafluoroethylene Teflon II coated frying pans in Table III is a result of testing over 35 pans. Because of the numerous ways polytetrafluoroethylene Teflon II coatings can fail, considerable randomness was found. This is exhibited by the wide range of cooking cycles reported in Table III; and for this reason an average figure is also reported.

All "cooking release" data given in Table III relate to frying pan surfaces having some cooking oil on the surface. The need for cooking oil on conventional frying pans without a release coating, of course, is well known. It has been found that cooking oil is also required when cooking on surfaces coated with polytetrafluoroethylene TEFLON II coatings. Oil-free polytetrafluoroethylene Teflon II coatings, such as on new pans or pans which have been washed with strong detergents or acetone, exhibit unsatisfactory release properties and are very difficult to use as a cooking surface. The illusion of oil-free cooking on surfaces coated with polytetrafluoroethylene Teflon Ii material is created by the fact that the material is porous, and this porosity permits polytetrafluoroethylene TEFLON Ii coatings to hold oil for long periods of time. This porosity is a most serious drawback in resisting scratches and achieving long life. Futher, cooking oil held by the coating can become rancid. The "cooking release" data reported in Table III also are the result of a subjective opinion of a laboratory technician evaluating "cooking release" while cooking and while cleaning of the pans between cooking cycles.

After 500 cooking cycles, an appraisal of the appearance of the pan tested was made. This data is also reported in Table III. An appraisal was made as to whether the appearance was "excellent," "good," "poor." Where the coating surface was worn through, Table III indicates "worn through." Significantly, there were a large number of frying pans having polytetrafluoroethylene TEFLON II coatings which assumed poor appearance after a relatively few number of cooking cycles. In fact, of all of the pans tested, 60% of the pans had unsatisfactory appearance when they reached 300 cooking cycles. Very rarely did such a coating survive normal treatment without continuously increased scratches and scuff marks. The best coating formulation for use on frying pans of the composition disclosed and claimed herein, in contrast, had excellent appearance after 1,000 to 1,250 cooking cycles. No pans tested with the preferred coating composition of the invention thereon suffered appearance loss before 500 cooking cycles.

Additionally, the coating composition of the invention exhibits extremely good resistance to chemical attack. Foods comprising acetic acid and citric acid, such as spaghetti sauce, food containing ethyl alcohol, were cooked in a frying pan for 24 hours without any visible effects. Also, the coating composition was also subjected to reagents such as 5 percent weight hydrochloric acid-water solution, 5 percent weight sulphuric acid-water solution, chlorox, without any visible effect. Further, the frying pan coated with the composition of the invention was subjected to 100 washes in a dishwasher using conventional diswasher detergent resulting in no visible effect. Frying pans having polytetrafluoroethylene Teflon II coatings also are unaffected when subjected to the above tests. Thus, both coatings have similar chemical resistance.

The following Examples will further illustrate the present invention as it pertains to coating compositions in which the polyimide is a poly(methylene p,p'-dianiline) amide-(methylene p,p'-dianiline) imide of trimellitic anhydride formed by reacting trimellitic anhydride and p,p'-diphenyl methane diisocyanate.

EXAMPLE I

A solution is formed by dissolving 60 grams (0.31 moles) of trimellitic acid anhydride in 496.8 grams of N-methyl-2-pyrrolidone and 55.2 grams of an aromatic solvent (NJ-100 solvent, as sold by Hoosier Solvents and Chemicals Corporation) by stirring the same at room temperature and atmospheric pressure. Both the aromatic solvent and the N-methyl-2-pyrrolidone contain less than 0.12 percent weight water. After a clear solution is obtained, 78 grams (0.31 moles) of p,p'-diphenyl methane diisocyanate (Multrathane M, as sold by Mobay Chemical Company) is added to the solution and the solution is mixed very slowly for about 30 minutes. The solution is then allowed to stand, without stirring, at room temperature and atmospheric pressure for about 24 hours. The solution is then once again agitated and the solution temperature is raised to about 190°C. The solution is maintained at this temperature and atmospheric pressure and agitated for about 2 hours. A condenser is used to prevent solvent loss. The resultant solution is cooled to room temperature and filtered, if necessary. The viscosity of the product at 30°C was measured at about 880 cps, utilizing a Brookfield viscometer and a resin solution of approximately 20 percent weight resin and 80 percent weight solvent. The resin solution was then adjusted to approximately 25 percent weight resin and 75 percent weight solvent.

EXAMPLE II

A solution is formed by dissolving 60 grams (0.31 moles) of trimellitic acid anhydride in 372.6 grams of N-methyl-2-pyrrolidone and 41.4 grams of an aromatic solvent (NJ-100 solvent, as sold by Hoosier Solvents and Chemicals Corporation) by stirring the same at room temperature and at atmospheric pressure. Both the aromatic solvent and the N-methyl-2-pyrrolidone contain less than 0.12 percent weight water. After a clear solution is obtained, 78 grams (0.31 moles) of p,p'-diphenyl methane diisocyanate (Multrathane M, as sold by Mobay Chemical Company) is added to the solution and the solution is mixed very slowly for about 30 minutes. The solution is then allowed to stand, without stirring, at room temperature and atomspheric pressure for about 16 hours. The solution is then once again agitated and the solution temperature is raised to about 190°C. The solution is maintained at this temperature and atmospheric pressure and agitated for about two hours. A condenser is used to prevent solvent loss. The resultant solution is cooled to room temperature and filtered, if necessary. The viscosity of the product at 30°C was measured at about 1000 cps, utilizing a Brookfield viscometer and a resin solution of approximately 25 percent weight resin and 75 percent weight solvent.

EXAMPLE III

A solution is formed by dissolving 63 grams (0.325 moles) of trimellitic acid anhydride in 314 grams of N-methyl-2-pyrrolidone by stirring the same at room temperature and atmospheric pressure. The N-methyl-2-pyrrolidone contains less than 0.12 percent weight water. After clear solution is obtained, 78 grams (0.31 moles) of p,p'-diphenyl methane diisocyanate (Multrathane M, as sold by Mobay Chemical Company) is added to the solution and the solution is mixed very slowly for about 30 minutes. The solution is then allowed to stand, without stirring, at a temperature of about 65°C and atmospheric pressure for about 12 hours. The solution is then once again agitated and the solution temperature is raised to about 200°C. The solution is maintained at this temperature and atmospheric pressure and agitated for about 2 hours. A condenser is used to prevent loss. The resultant solution is cooled to room temperature and filtered if necessary. The resultant solution is adjusted by dilution to a resin solution of approximately 25 percent weight resin and 75 percent solvent.

EXAMPLE IV

A solution is formed by dissolving 60 grams (0.31 moles) of trimellitic acid anhydride in 600 grams of N-methyl-2-pyrrolidone and 110 grams of an aromatic solvent (NJ-100 solvent, as sold by Hoosier Solvents and Chemicals Corporation) by stirring the same at room temperature and atmospheric pressure. Both the aromatic solvent and the N-methyl-2-pyrrolidone contain less than 0.15 percent weight water. After a clear solution is obtained, 82 grams (0.326 moles) of p,p'-diphenyl methane diisocyanate (Multrathane M, as sold by Mobay Chemical Company) is added to the solution and the solution is mixed very slowly for about 30 minutes. The solution is then allowed to stand, without stirring, at about 80°C and atmospheric pressure for about five hours. The solution is then once again agitated and the solution temperature is raised to about 200°C. The solution is maintained at this temperature and atmospheric pressure and agitated for about 2 hours. A condenser is used to prevent solvent loss. The resultant solution is cooled to room temperature and filtered, if necessary. The resultant solution is adjusted by dilution to a resin solution of approximately 25 percent weight resin and 75 percent solvent.

EXAMPLE V

A solution is formed by dissolving 63 grams (0.325 moles) of trimellitic acid anhydride in 700 grams of N-methyl-2-pyrrolidone and 129 grams of an aromatic solvent (NJ-100 solvent, as sold by Hoosier Solvents and Chemicals Corporation) by stirring the same at room temperature and atmospheric pressure. Both the aromatic solvent and the N-methyl-2-pyrrolidone contain less than 0.12 percent weight water. After a clear solution is obtained, 78 grams (0.31 moles) of p,p'-diphenyl methane diisocyanate (Multrathane M, as sold by Mobay Chemical Company) is added to the solution and the solution is mixed very slowly for about 30 minutes. The solution is then allowed to stand, without stirring, at about 65°C and atmospheric pressure for about 12 hours. The solution is then once again agitated and the solution temperature is raised to about 200°C. The solution is maintained at this temperature and atmospheric pressure and agitated for about 2 hours. A condenser is used to prevent solvent loss. The resultant solution is cooled to room temperature and filtered, if necessary. The resultant solution is adjusted by dilution to a resin solution of approximately 25 percent weight resin and 75 percent solvent.

The following Examples will further illustrate the present invention as it pertains to formulating the coating compositions of the invention from polyimides. Examples VI through XVIII use the terms "polyimide", "polysiloxane", "filler", "solvent" to encompass any one of the aforementioned polyimides, polysiloxanes, fillers, or solvents. These Examples illustrate formulations comprising fillers up to about 1,200 percent weight of the imide, polysiloxanes up to about 100 percent weight of the imide, and final coating compositions in which solvent portion thereof is at least 300 percent weight of the imide, diluted to a composition having from about 15 percent to about 33 percent weight solids. However, compositions having little or no polysiloxane, i.e., Example XVIII can be applied by spraying with less dilution so long as the solids content doesn't exceed, say about 60 to 70 percent weight solids.

EXAMPLE VI

Five parts of a 25 percent weight polyimide solution, one part of a powdered filler, 0.8 parts of a phenyl methyl substituted polyfunctional polysiloxane, fifteen parts of solvent, a conventional curing catalyst for the polysiloxane in its recommended amount, and if desired, a conventional flow additive, in its recommended amount, are thoroughly blended together into a homogeneous mixture. Sufficient mixing energy must be applied to the mixture to achieve an intimate dispersion of polyimide and polysiloxane and to deglomerate the filler. Mixing for approximately 15 minutes at high speed in a Cowles high shear mixer or the equivalent will usually suffice. The mixture is then diluted with additional solvent to a solids content from about 15 percent to about 33 percent weight for application.

An aluminum frying pan, several aluminum test panels, and a Taber abraser disc are prepared for coating by subjecting the surfaces to be coated to sand blasting or its equivalent. The mixture can then be applied by spraying the same on the sand blasted surfaces using any conventional spray equipment. It has been found that a coating up to a maximum of about 2.5 mils can be applied as a single coating. If additional thickness is required, the solvent of the first-applied coating is flashed in an oven at about 150°C to 225°C for a few minutes (not more than 3 minutes), and then a second coating is applied over the first coating with good adhesion between the coats. The flashing step is merely to remove a portion of the solvent from the first coating, and is not to cure the coating. If the first coating is fully cured, a second coat will not adhere to the first coat.

Also, it has been found that preheating the surface to which the coating is applied will help produce smooth continuous coatings. Preheat temperatures vary with respect to the thickness of the material being coated; however, temperatures from about 150°C to about 225°C are preferred. The lower temperatures correspond to about 100 to 130 gauge aluminum; the higher temperatures correspond to about 70 to about 80 gauge aluminum.

After the requisite coating thickness is built, the composition is subjected to a final cure. The coating can be cured at temperatures from about 250°C to about 300°C. For coatings ranging in thickness from 1 mil to about 4 mils, final cures have been achieved at 275°C for about 10 to about 30 minutes and at 300°C for about 5 minutes.

EXAMPLES VII to XVIII

Examples VII to XVIII are identical to Example VI except for the ratios of polyimide to polysiloxane, polyimide to filler, and polyimide to solvent. These ratios are all set out in Table I.

The results of testing coatings of the invention applied in accordance with Examples VI through XVII are tabulated in Table II. In this Table, the hardness of the coating as determined by the pencil hardness test, the abrasion resistance of the coating, the adhesion of the coating as determined by the crosshatch adhesion test, and the "release" properties of the coating are all shown. Each of the coatings tested exhibit better abrasion resistance, more hardness at both 25°C and 400°F and better adhesion to the substrate than polytetrafluoroethylene TEFLON II coatings. The coatings of Examples VI, XII, XVII and XVIII exhibit the best release properties; the coating of Example VI exhibits the best overall properties for cookware coatings; whereas the other coatings all exhibit some "release" properties.

A direct comparison between selected coatings of the composition with the polytetrafluoroethylene Teflon II coating are shown in Table III. "Cooking release", the number of cooking cycles a coating can withstand before total failure, and the appearance after 500 cycles are all tabulated. Each of the coatings selected show properties comparable to polytetrafluoroethylene Teflon II coatings.

While there have been described above the principles of this invention in connection with specific chemistry, it is to be clearly understood that this description is made only by way of example and not as a limitation to the scope of the invention.

TABLE I

EXAMPLES VII to XVIII

| EXAMPLE NO. | POLYIMIDE PARTS | POLYSILOXANE PARTS | FILLER PARTS | SOLVENT PARTS |
|---|---|---|---|---|
| VII | 1 | 0.2 | 2 | 10.0 |
| VIII | 2 | 0.3 | 1 | 5.5 |
| IX | 3 | 0.45 | 1.1 | 10.0 |
| X | 4 | 0.6 | 1 | 15.0 |
| XI | 1 | 0.0 | 2 | 10.5 |
| XII | 5 | 1.0 | 0.96 | 17.0 |
| XIII | 2 | 0.2 | 1 | 7.25 |
| XIV | 3 | 0.8 | 1 | 10.0 |
| XV | 1 | 0.075 | 1.5 | 9.0 |
| XVI | 2 | 0.35 | 2 | 9.0 |
| XVII | 5 | 1 | 0 | 6.0 |
| XVIII | 1 | 0.0 | 3 | 10.0 |

TABLE II

TEST RESULTS OF COATINGS OF THE INVENTION

| EXAMPLE NO. | THICKNESS MILS | ABRASION TABER - mg/1000 | PENCIL HARDNESS 25°C | PENCIL HARDNESS 400°F | ADHESION CROSS-HATCH % REMAINING | RELEASE |
|---|---|---|---|---|---|---|
| VI | 2.5 | 77.6 | 9H | 9H | 100 | Excellent |
| VII | 3.0 | 115.0 | 4H | 3H | 86 | Good |
| VIII | 2.5 | 85.0 | 7H | 6H | 100 | Unsatisfactory |
| IX | 2.5 | 86.4 | 7H | 7H | 100 | Average |
| X | 2.5 | 72.4 | 9H | 9H | 100 | Good |
| XI | 1.5 | 122.0 | 4H | 4H | 95 | Good |
| XII | 2.5 | 63.5 | 9H | 9H | 100 | Excellent |
| XIII | 2.5 | 78.9 | 7H | 7H | 100 | Unsatisfactory |
| XIV | 4.0 | 89.0 | 7H | 6H | 100 | Average |
| XV | 3.9 | 118.0 | 4H | 4H | 96 | Unsatisfactory |
| XVI | 3.5 | 102.4 | 4H | 4H | 98 | Unsatisfactory |
| XVII | 1.1 | 78.0 | 9H | 9H | 100 | Excellent |

Teflon II coatings and coatings of Example XVIII exhibit a pencil hardness of less than 4H (25°C & 400°F) and excellent release; the remaining tests are not applicable to such coatings, both the abrasion and adhesion of such coatings are substantially less than the coatings of the invention reported above.

TABLE III

COMPARISON WITH POLYTETRAFLUOROETHYLENE TEFLON II

| | THICKNESS MILS | COOKING RELEASE | COOKING CYCLES | APPEARANCE AFTER 500 CYCLES |
|---|---|---|---|---|
| TEFLON II | 1.7 | Excellent | 25–800 280 average | Worn through |
| EXAMPLE NO. VI | 2.5 | Excellent | 1000 – 1250 | Excellent |
| EXAMPLE NO. XII | 2.5 | Good | 500 – 700 | Good |
| EXAMPLE NO. IX | 2.5 | Average | 200 – 300 | Worn through |

What is claimed is:

1. A non-porous, durable, tough coating composition having good release properties, good resistance to thermal degradation, and good cut, scratch and abrasion resistance comprising an essentially linear, high molecular weight polyaromatic, polycarboxylic aromatic polyimide and a miscible phenyl and methyl substituted polyfunctional polysiloxane having a degree of substitution from about 1.0 to about 1.5 in an amount up to about 100 percent weight of said imide.

2. The composition of claim 1 wherein said imide is of the group consisting of poly(methylene p,p'-dianiline) amide-(methylene p,p'-dianiline) imide of trimellitic anhydride and the polyimides of pyromellitic dianhydride.

3. The composition of claim 2 wherein said polyimide is a reaction product of an aromatic diisocyanate and an aromatic tricarboxylic acid.

4. The composition of claim 1 wherein the amount of said polysiloxane is less than about 80 percent weight of said imide, and further comprising powdered filler and pigment up to about 1200% weight of said imide, said filler and pigment having a particle size less than 2.5 microns and 98 percent weight thereof passing a 325 mesh screen.

5. The composition of claim 1 further comprising powdered filler and pigment up to about 800 percent weight of said imide, said filler and pigment having a particle size less than 2.5 microns and 98 percent weight thereof passing a 325 mesh screen.

6. The composition of claim 5 wherein said pigment and filler comprise up to about 20 percent weight of said imide of a colored pigment and filler.

7. The composition of claim 5 wherein said polysiloxane is present in an amount of from about 60 percent to about 90 percent weight of said imide, said powdered filler and pigment are present in an amount of from about 50 percent to about 150 percent weight of said imide, said imide being a poly(methylene p,p'-dianiline) amide-(methylene p,p'-dianiline) imide of trimellitic anhydride.

8. The composition of claim 7 wherein said filler is a zirconium silicate powder.

9. The composition of claim 7 wherein said filler and pigment are chosen from the group consisting of zirconium silicate, silicon dioxide, titanium dioxide, aluminum oxide, iron oxide and carbon black powders.

10. A substrate coated with a layer of the composition of claim 9, said layer ranging in thickness from about 1.5 to about 4.0 mils, said layer withstanding in excess of about 200 cooking cycles, having an abrasion resistance measured by 1000 cycles of a Taber abraser of less than 200 milligrams weight loss, having excellent appearance after 500 cooking cycles, adhering to said substrate to an extent that scratching through said layer does not loosen said layer from said substrate.

11. The composition of claim 9 further comprising a solvent in an amount in excess of about 300 percent weight of said imide whereby said composition is a solution.

12. The composition of claim 11 wherein said solvent comprises at least about two-thirds of said composition.

* * * * *